United States Patent [19]

Del Matto

[11] 4,050,702
[45] Sept. 27, 1977

[54] SEGMENTED SEALING STRUCTURE

[75] Inventor: Antonio Del Matto, Brugg, Switzerland

[73] Assignee: BBC Brown Boveri & Company Limited, Baden, Switzerland

[21] Appl. No.: 676,382

[22] Filed: Apr. 13, 1976

[30] Foreign Application Priority Data

Apr. 28, 1975 Switzerland ............... 5426/75

[51] Int. Cl.² ............................................. F16J 9/06
[52] U.S. Cl. ........................... 277/148; 277/143; 277/149; 277/193; 277/199
[58] Field of Search ............... 277/148, 199, 149, 143, 277/193; 267/1.5, 156, 157

[56] References Cited

U.S. PATENT DOCUMENTS

| 955,527 | 4/1910 | Mills | 277/143 |
|---|---|---|---|
| 1,708,816 | 4/1929 | Williams | 277/143 |
| 2,319,098 | 5/1943 | Zahodiakin | 277/148 |
| 2,956,795 | 10/1960 | Foster | 267/156 |
| 3,066,943 | 12/1962 | Brenneke | 277/143 |
| 3,068,018 | 12/1962 | Tydeman | 277/193 |
| 3,173,697 | 3/1965 | Doperalski | 277/148 |
| 3,203,705 | 8/1965 | Doperalski | 277/199 |
| 3,722,897 | 3/1973 | Brenneke | 277/148 |

Primary Examiner—Richard E. Aegerter
Assistant Examiner—L. Footland
Attorney, Agent, or Firm—Pierce, Scheffler & Parker

[57] ABSTRACT

A packing ring for use between two surfaces to be sealed relative to each other is comprised of two ring components each of which is constituted by an assembly of ring segments which are provided with a projection at one end which engages a complementarily configured recess located at one end of an adjacent ring segment thereby providing a circumferentially extending interlocking of all segments of each ring. The ring segments of one ring are circumferentially staggered relative to the segments of the other ring by half a segment pitch, and each ring segment is provided with one or more recesses such that the respective recesses in the segments of the two rings are aligned in face-to-face relation so as to form a circumferential array of slots for receiving pressure springs.

5 Claims, 5 Drawing Figures

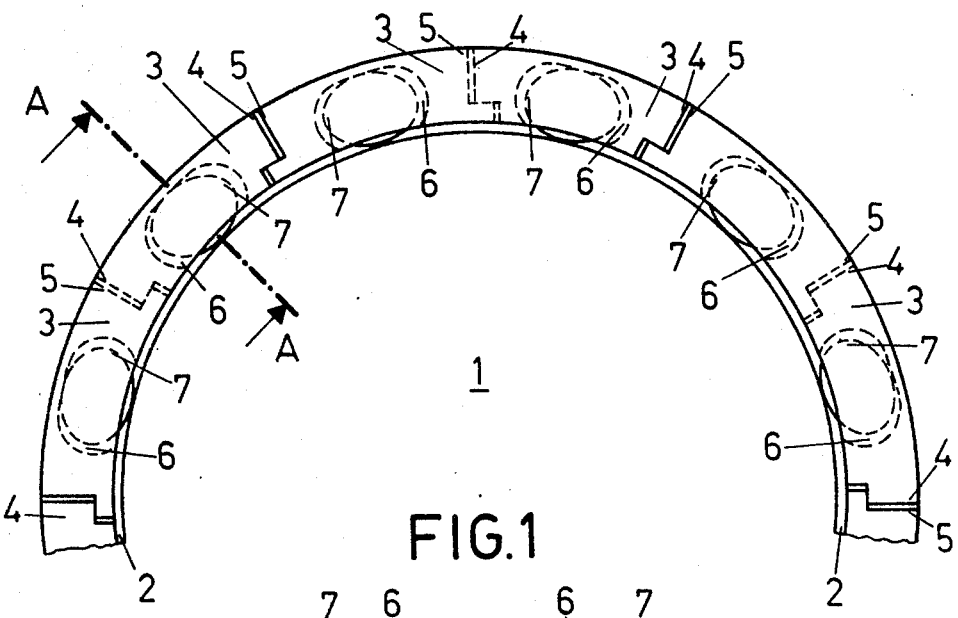
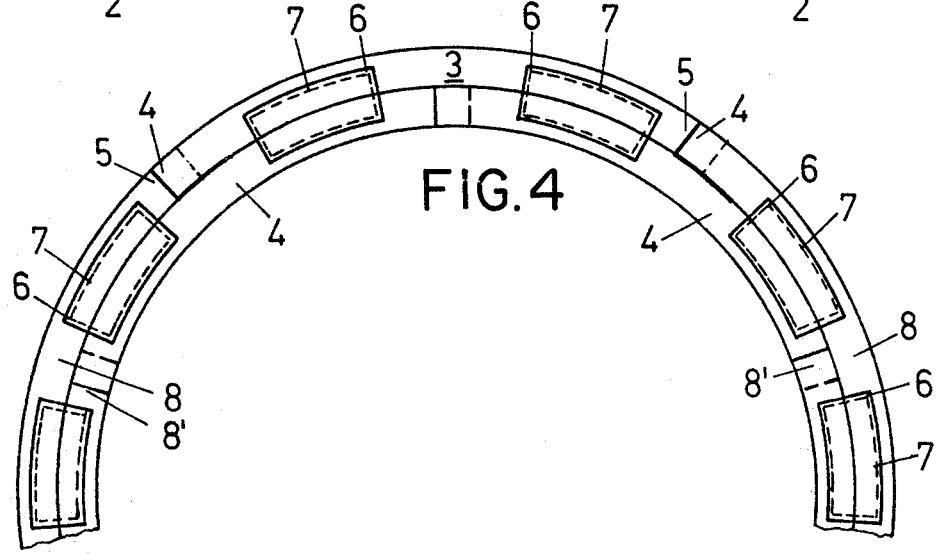
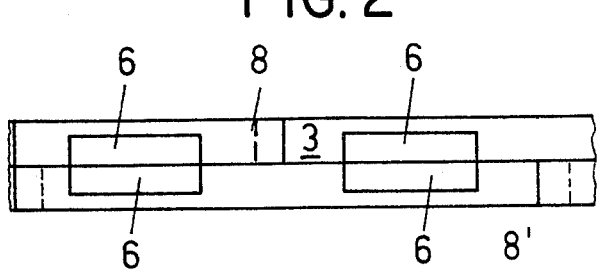
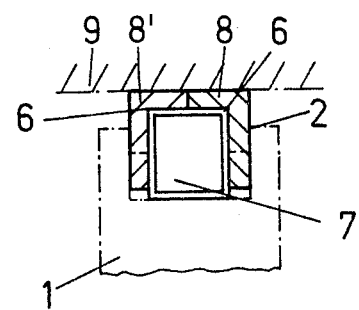
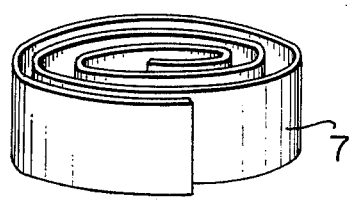

SEGMENTED SEALING STRUCTURE

This invention relates to an improved seal structure for sealing two surfaces relative to each other and which move in vertical as well as in horizontal directions.

Various constructions for sealing components are known for sealing two surfaces relative to one another which move in a vertical or horizontal direction, for example, when sealing pistons relative to the working surfaces of the cylinders in which they operate. The sealing components accomplish the desired sealing primarily by virtue of the inherent elasticity of the material which is used for their construction, and especially in the case of piston rings which attain their sealing effect with, or without spring-loading, depending upon the particular conditions to be met.

In a case where wide differences in termperature exist between the working surface of the cylinder and piston, correspondingly large heat expansions are generated in a radial direction, in addition to axial displacement of the piston. The high temperature, as well as some abrasive wear produced in the cylinder wall and piston rings will have the result that the cylinder wall will not remain absolutely round but will deform eventually into a polygon. As soon as piston rings of known construction lose their ability to adjust to this out-of-roundness, a leakage will develop in the seal between piston and cylinder wall.

Piston rings of known construction have the additional disadvantage that they can be installed in an axial direction only, and that the piston as well as the cylinder must not have any separation planes.

Metallic bellows provide another known sealing arrangement and it is possible to obtain by their use a practially absolute sealing effect between the two surfaces, but under the conditions that there is no expansion in the radial direction and that no separating planes exist at the two surfaces to be sealed one against the other.

The object of the present invention is to provide an improved sealing ring structure, e.g., one to be inserted between a cylinder and piston for use especially in cases where the piston temperature is relatively low and the cylinder temperature is relatively high thus resulting in a large degree of radial expansion, and which will provide a satisfactory seal at both surfaces even in the event of a large axial movement. Moreover, the sealing component should be capable of a comparatively simple installation, withstand satisfactorily the temperature difference between piston and cylinder wall, and should retain its sealing capability under any occurring temperature condition, even if the cylinder wall departs from its absolutely round configuration at the working zone as compared to the piston.

The invention solves these problems thusly that the packing ring is composed of two adjacent ring components each of which is constituted by an assembly of ring segments which are provided with a projection at one end which engages in a complementarily configured recess located at one end of an adjacent ring segment thereby providing a circumferentially extending interlocking of all of the segments of each ring. Moreover, the segments of one ring are circumferentially staggered relative to the segments of the other ring by half a segment pitch and each ring segment is provided with at least one recess, e.g., two such recesses can be provided, and the respective recesses in the segments of the two adjacent rings are circumferentially aligned in face-to-face relation so as to form a circumferential array of slots for receiving spring elements. In the case of a piston ring structure, the springs in these slots establish a resilient contact with the base of the piston groove in which the rings are seated and thus urge the peripheral surfaces of the two rings radially outward into contact with the cylinder wall.

The segmented construction of the sealing rings in accordance with the invention has the beneficial result there is no direct contact between the two surfaces to be sealed one against the other, and that even in the case where an out-of-roundness develops in the cylinder wall, the individual segments of the rings will be able to re-align themselves in conformity which any local conditions. The arrangement of the interlocking between adjacent ring segments by means of the inter-engaged and projections and recesses has the effect that should there be an increase in the circumferential dimension of the surface to be sealed, the individual sealing ring segments will be able to expand likewise without the danger that leakage gaps will develop at the junctions between the ring segments. The pressure springs which are located in the slots established by aligned recesses in the ring segments will ensure a flush contact of the ring segments with the working surface of the cylinder. The individual ring segments are also gripped between the cylinder and piston, and the pressure springs serve the additional function of a "bolt," thus acting at the same time as the retaining member between the individual sealing ring segments and preventing the segments of one ring from being displaced circumferentially with respect to the segments of the adjacent ring.

In accordance with one embodiment of the invention the side-by-side placed segmented sealing rings together with their associated spring components can be arranged to provide a ring-type sealing structure which acts in a radially outward direction from the center of the ring, i.e., an application of the sealing structure to a piston operating in a cylinder as has been already mentioned, or to one which acts in a direction axially of the ring center.

It will also be advantageous to give the pressure springs located in the slots formed by aligned recesses in the segments of the two face-to-face rings a combined conical-spiral configuration which function in a radial as well as in an axial direction. The pressure spring will thus act at the same time as a connecting link between individual segments of the two rings and also as a contact pressure medium for the sealing surfaces at the cylinder wall to be sealed.

The foregoing as well as other objects and advantages inherent in the improved sealing ring structure in accordance with the invention will become more apparent from the following detailed description of preferred embodiments and the accompanying drawings wherein:

FIG. 1 is a view of one embodiment of the invention wherein the novel sealing ring principle has been applied to a piston in the form of a segmented piston ring seated in a groove formed in the piston for radial sealing of the piston relative to the cylinder wall in which the piston operates;

FIG. 2 is a view in development showing a portion of the piston ring structure of FIG. 1 as seen from its inner periphery;

FIG. 3 is a transverse sectional view taken on line A—A of FIG. 1;

FIG. 4 is a view of another embodiment of the invention wherein the segmented sealing ring according to the novel sealing principle works in an axial direction to perform its sealing function; and FIG. 5 is view in perspective of one of the spiral springs used in conjunction with the sealing rings.

With reference now to the drawings and in particular to the embodiment of the invention depicted in FIGS. 1 to 3 a piston 1 is shown with its groove 2 into which a segmented piston ring structure in accordance with the invention is inserted. The ring structure actually consists of two ring components 8 and 8' as shown in FIG. 3 and which are located in face-to-face relation. Each of the ring components is constituted by an assembly of ring segments 3 which are provided with a projection 4 at one end which engages in a complementary configured recess 5 located at one end of the adjacent ring segment, thereby providing a circumferential interlocking of all of the segments 3 of each ring 8, 8'. Moreover, as shown in FIGS. 1 and 2, the segments 3 of one ring 8 are circumferentially staggered relative to the segments 3 of the other ring 8' by half a segment-pitch. Each ring segment is also provided with at least one recess 6. In the illustrated embodiment, each ring segment is provided with two such recesses 6 circumferentially spaced apart and the respective recesses 6 in the ring segments of the rings 8, 8' are in alignment with each other as shown in FIG. 2 to establish circumferentially spaced slots for receiving spirally wound springs 7. These springs one of which is illustrated in FIG. 5—establish a resilient contact with the base of the piston groove 2 and thus urge the peripheral surfaces of the two ring components 8 and 8' radially outward into contact with the cylinder wall 9 as shown in FIG. 3. The springs 7 in conjunction with the aligned recesses 6 of the adjacent rings 8,8' also perform a retaining function in that they prevent the two rings from shifting circumferentially with respect to each other, and the circumferentially staggered ring segments 3 of the two segmented rings 8, 8' prevent any possibility of leakage at the inter-engaged projections 4 and recesses 5 at the ends of the segments.

After the segmented rings 8, 8' with their springs 7 have been inserted into the groove 2 of the piston the latter can now be installed in the cylinder by first applying a radially inward pressure to the rings 8, 8' thus compressing them and the springs 7 radially inward to reduce the ring diameter enough to then permit the piston with the rings assembled thereon to be inserted into the cylinder. After installation within the cylinder, the springs 7 expand the segmented rings 8, 8' to an outer diameter which is equal to that of the cylinder, and the individual segments 3 are prevented from becoming loose by virtue of their overlapped interconnections at the ends. In operation, should the diameter of the cylinder enlarge or become out-of-round, the projections 4 opposite the recesses 5 at the ends will move slightly away from one another but the overlap between them is sufficient to prevent creation of any pass-through gap thus still maintaining a full sealing effect. For disassembly, or replacement of a ring segment 3, this segment can be tilted upwardly and lifted from the piston groove 2 without the need for removing any of the other ring segments, after first disengaging the projection 4 at one end of the segment from the recess 5 at the end of the adjacent segment.

The circumferential staggering of the ring i.e., seal segments 3 permits a radial installation in the upper part of the cylinder without the use of any special tools. The sealing effect at the cylinder wall and piston is accomplished by the elastic force of the pressure springs 7 seated in the piston groove 2 due to the one-sided high pressure. The individual sealing ring segments 3 will fully match any existing shape of the cylinder wall 9 when fully installed, and they will be most effective if the ring segments are kept short in their circumferential dimension.

A different embodiment of the invention is illustrated by the segmented ring structure illustrated in FIG. 4. Here it will be seen that the two segmented rings, 8, 8' with their circumferentially aligned recesses 6 which establish slots for receiving pressure springs 7 are so arranged in conjunction with the springs that a sealing pressure is applied in a direction axially and also radially of the ring centers. The two rings 8, 8' have different diameters and are seated in a groove, not shown, the diameter of the outer periphery of the inner ring 8' being equal to the diameter of the inner periphery of the outer ring 8 so as to be in contact with each other. The interlocking of the segments 3 of each ring is the same as in the embodiment of FIGS. 1-3, i.e., a projection 4 at one end of each segment engaged with a complementary recess 5 at the end of an adjacent segment.

I claim:

1. A packing ring structure for sealing two surfaces relative to each other comprising a pair of adjacently positioned ring components, each of said ring components being constituted by an assembly of ring segments provided with a projection at one end engaged with a complementarily configured recess at one end of an adjacent ring segment thereby providing a circumferentially extending interlocking of all the ring segments, said ring segments of the two ring components being staggered circumferentially relative to each other and each said ring segment being provided with at least one recess, the respective recesses in the segments of the two ring components being circumferentially aligned in face-to-face relation so as to form a circumferential array of slots, and pressure springs disposed in said slots.

2. A packing ring structure as defined in claim 1 wherein the ring segments of the two ring components are staggered circumferentially by half a segment pitch.

3. A packing ring structure as defined in claim 1 wherein said ring components have the same diameter and are placed in side-by-side relation to form a piston ring and the pressure springs exert a sealing force on the ring segments acting in the radial direction of the ring components.

4. A packing ring structure as defined in claim 1 wherein said ring components have different diameters such that the inner diameter of one ring is equal to the outer diameter of the other ring so as to fit one of the rings within the other, and the pressure springs exert a sealing force on the ring segments acting in the axial direction of the inter-fitting ring components.

5. A packing ring structure as defined in claim 1 wherein said pressure springs have a spiral configuration which exert a pressure in the radial direction.

* * * * *